United States Patent
Wang et al.

(10) Patent No.: US 12,056,361 B2
(45) Date of Patent: Aug. 6, 2024

(54) MEMORY DEVICE AND OPERATION METHOD THEREOF

(71) Applicant: MACRONIX INTERNATIONAL CO., LTD., Hsinchu (TW)

(72) Inventors: Wei-Chen Wang, Taipei (TW); Tse-Yuan Wang, Jinning Township, Kinmen County (TW); Yuan-Hao Chang, Taipei (TW); Tei-Wei Kuo, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 43 days.

(21) Appl. No.: 17/814,888

(22) Filed: Jul. 26, 2022

(65) Prior Publication Data
US 2024/0036735 A1    Feb. 1, 2024

(51) Int. Cl.
*G06F 12/00* (2006.01)
*G06F 3/06* (2006.01)

(52) U.S. Cl.
CPC .......... *G06F 3/0613* (2013.01); *G06F 3/0644* (2013.01); *G06F 3/0679* (2013.01)

(58) Field of Classification Search
CPC .... G06F 3/0613; G06F 3/0644; G06F 3/0679; G06F 12/0246; G06F 12/0802; G06F 12/1018
See application file for complete search history.

(56) References Cited

U.S. PATENT DOCUMENTS

| | | | |
|---|---|---|---|
| 9,053,013 B2 | 6/2015 | Zhang et al. | |
| 11,437,087 B2 | 9/2022 | Wang et al. | |
| 11,544,198 B2 | 1/2023 | Kim et al. | |
| 11,593,008 B2 | 2/2023 | Lin | |
| 2013/0132699 A1 | 5/2013 | Vaishampayan et al. | |
| 2016/0085585 A1 | 3/2016 | Chen et al. | |
| 2017/0277636 A1* | 9/2017 | Lee | G06F 12/0895 |
| 2019/0087327 A1 | 3/2019 | Kanno et al. | |
| 2020/0110555 A1* | 4/2020 | Hsiao | G06F 3/0679 |

FOREIGN PATENT DOCUMENTS

| | | |
|---|---|---|
| CN | 104216837 A | 12/2014 |
| CN | 114546249 A | 5/2022 |
| TW | 201405309 A | 2/2014 |
| TW | 202121414 A | 6/2021 |
| TW | 202228136 A | 7/2022 |

* cited by examiner

*Primary Examiner* — Shawn X Gu
(74) *Attorney, Agent, or Firm* — McClure, Qualey & Rodack, LLP

(57) ABSTRACT

An embodiment of the present disclosure discloses a memory device. The memory device comprises a memory controller, a buffer and a memory array. The buffer is coupled to the memory controller or embedded in the memory controller. A storage space of the buffer is configured by the memory controller to include a plurality of groups. The memory array is coupled to the memory controller, and comprising a plurality of tiles. The groups are one-to-one corresponding to the tiles. Each of the groups is configured to store data to be written into the corresponding tile. The memory controller performs one or more write operations based on the groups.

10 Claims, 9 Drawing Sheets

| 0~10000 | 10001~20000 | 20001~30000 | 30001~40000 | 40001~50000 | 50001~60000 | 60001~70000 | 70001~80000 | 80001~90000 | 90001~100000 |
|---|---|---|---|---|---|---|---|---|---|
| S0 | S1 | S2 | S3 | S4 | S5 | S6 | S7 | S8 | S9 |

FIG. 6

| Page index | #1 | #2 | #3 | ... | #4096 |
|---|---|---|---|---|---|
| Written interval | 0011 | 0001 | 0111 | ... | 0000 |

FIG. 7

| Page index | #1 | #2 | #3 | ... | #4096 |
|---|---|---|---|---|---|
| Written or not | 0 | 0 | 0 | ... | 0 |

FIG. 8

| Page index | #1 | #2 | #3 | ... | #4096 |
|---|---|---|---|---|---|
| Written or not | 1 | 0 | 0 | ... | 0 |

FIG. 9

| Page index | #1 | #2 | #3 | ... | #4096 |
|---|---|---|---|---|---|
| Written or not | 1 | 0 | 1 | ... | 0 |

FIG. 10

| Page index | #1 | #2 | #3 | ... | #4096 |
|---|---|---|---|---|---|
| Written or not | 1 | 0 | 1 | ... | 0 |

FIG. 11

| Page index | #1 | #2 | #3 | ... | #4096 |
|---|---|---|---|---|---|
| Written interval | 1000 | 0011 | 1000 | ... | 0000 |

FIG. 12

| Label | 000 | | | 100 | | |
|---|---|---|---|---|---|---|
| Page index | #1 | ... | #2048 | #2049 | ... | #4096 |
| Written interval | 1 | ... | 0 | 0 | ... | 0 |

FIG. 13

| Page index | #1 | #2 | #3 | ... | #4096 |
|---|---|---|---|---|---|
| Written interval | 0000 | 0010 | 0111 | ... | 0000 |

FIG. 14

MEMORY DEVICE AND OPERATION METHOD THEREOF

BACKGROUND

Technical Field

The invention relates to a memory device and an operation method thereof.

Description of the Related Art

3D NOR flash memory device has the characteristic that the read latency is much less than the write latency. How to improve the data write efficiency of 3D NOR flash memory device is an important research subject. In the other hand, the management of write disturbance is also an important subject of 3D NOR flash memory device.

SUMMARY

An embodiment of the present disclosure discloses a memory device. The memory device comprises a memory controller, a buffer and a memory array. The buffer is coupled to the memory controller or embedded in the memory controller. A storage space of the buffer is configured by the memory controller to include a plurality of groups. The memory array is coupled to the memory controller, and comprising a plurality of tiles. The groups are one-to-one corresponding to the tiles. Each of the groups is configured to store data to be written into the corresponding tile. The memory controller performs one or more write operations based on the groups.

Another embodiment of the present disclosure discloses an operation method of memory device, comprising: configuring a storage space of a buffer to include a plurality of groups; and making the groups one-to-one corresponding to a plurality of tiles of a memory array. Each of the groups is configured to store data to be written into the corresponding tile. One or more write operations are performed based on the groups.

Yet another embodiment of the present disclosure discloses an operation method of memory device, comprising: establishing a plurality of write counter values and a plurality of written or not tables in a buffer; establishing a plurality of written interval tables in a memory array. The write counter values are one-to-one corresponding to the tiles, each of the write counter values is used to record the number of write operations performed on the corresponding tile, the write counter values have an initial value and a upper bond value, each of the counter values are divided into a plurality of intervals from the initial value to the upper bond value, the written or not tables are configured to record whether a plurality of pages of the tiles are written in the intervals corresponding to the write counter values, the written interval tables are one-to-one corresponding to the tiles, each of the written interval tables is used to record the intervals in which the pages of the corresponding tile last written.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 6 shows a mapping table of write counter value and interval according to an embodiment of the present disclosure.

FIG. 7 shows a written interval table according to an embodiment of the present disclosure.

FIGS. 8-10 show a written or not table according to an embodiment of the present disclosure.

FIG. 11 shows a written or not table according to another embodiment of the present disclosure.

FIG. 12 shows a written interval table according to another embodiment of the present disclosure.

FIG. 13 shows a written or not table according to yet another embodiment of the present disclosure.

FIG. 14 shows a written interval table according to yet another embodiment of the present disclosure.

DETAILED DESCRIPTION

Figure 1:
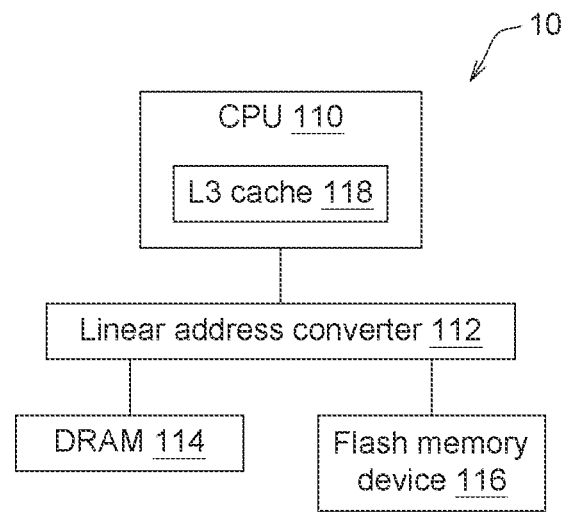
FIG. 1 shows a block diagram of computer system according to an embodiment of the present disclosure.

Referring to FIG. 1, FIG. 1 shows a block diagram of computer system according to an embodiment of the present disclosure. A computer system 10 includes a central processing unit (CPU) 110, a linear address converter 112, a dynamic random access memory (DRAM) 114 and a flash memory device 116. The central processing unit 110 may include a L3 cache 118. The DRAM 114 and the flash memory device 116 are coupled to the central processing unit 110 via the linear address converter 112. The linear address converter 112 could map the logical addresses used by the central processing unit 110 to physical addresses of the DRAM 114 and the flash memory device 116. With the embodiment shown in FIG. 1, it could be understood how the flash memory device 116 would be applied as hardware in computer system.

Figure 2:
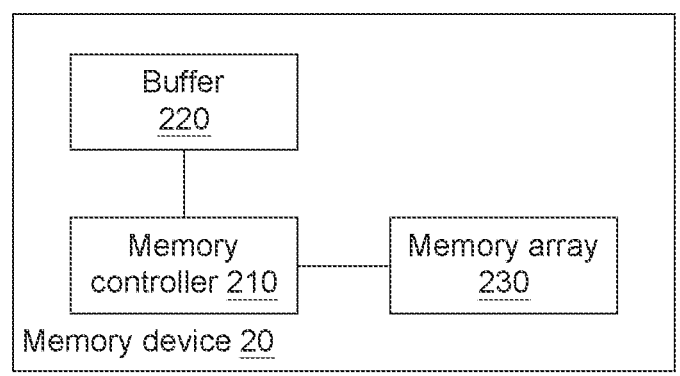
FIG. 2 shows a block diagram of memory device according to an embodiment of the present disclosure.

Referring to FIG. 2, FIG. 2 shows a block diagram of flash memory device according to an embodiment of present disclosure. A flash memory device includes a memory controller 210, a buffer 220 and a memory array 230.

The buffer 220 could be a storage device having high read/write speed such as static random access memory (SRAM). The buffer 220 could be embedded in the memory controller 210, or externally coupled to the memory controller 210. The memory array 230 is coupled to the memory controller 210. The memory controller 210 is configured to control and operate the memory array 230. In an embodiment, memory array 230 is 3D NOR flash memory array.

In an embodiment, the memory array 230 includes a number of chips. One chip includes a number of tiles. One tile includes a number of sectors. One sector includes a number of pages. One page includes a number of memory cells.

In an embodiment, the size of one page is variable, and has a maximum page size. The maximum size of writing data for one write operation performed by the memory controller 210 to the memory array 230 is a maximum write size. In an embodiment, the size of one page could be 64 byte (B), 128B or 256B (i.e., the maximum page size is 256B). 64B, 128B or 256B data could be written in one write operation (i.e., the maximum write data is 256B).

In order to reduce the number of write operation actually performed by the memory controller 210 to the memory array 230, the memory controller 210 could operate according to a first write policy and a second write policy.

The first write policy is configuring the buffer 220 to cause a storage space of the buffer 220 to include a number of groups, respectively associating (e.g., one-to-one corresponding) the groups to the tiles of the memory array, storing the data to be written into the group corresponding to the tile which the data to be written in, and performing the write operation based on the groups. For example, if the memory array 230 includes X tiles, the memory controller 210 may configure the buffer 220 to cause the storage space of the buffer 220 to include X groups respectively corresponding to the X tiles, wherein X is a positive integer. The group corresponding to a first tile is configured to store the data to be written into the first tile, the group corresponding to a second tile is configured to store the data to be written into the second tile, and so on. "Performing the write operation based on the groups" refers to the memory controller 210 would schedule the write operations for the data in the same group together in time. Performing the write operation based on the groups could increase the probability that the pages to be written are continuous. "The pages are continuous" refers to the physical addresses of these pages are continuous. While the pages to be written are continuous and the size of each of the pages to be written is smaller than the maximum page size, the memory controller 210 could combine multiple write operations into one write operation. For example, assuming that four pieces of 64B data are going to be written into four continuous 64B pages, the memory controller 210 could perform one 256B write operation to achieve the same result as four 64B write operation. In an embodiment, the memory controller 210 could calculate a hash value of the physical address of the page according to a hash function. By designing the hash function, the physical addresses of the pages belong to the same tile could correspond to the same hash value. The pages corresponding to the same hash value would correspond to the same group.

The second write policy is before performing the write operations to a target tile, determining whether the number of the write operations could be decreased by reading portion of data stored in the target tile to the buffer 220, if the determination is true, reading the portion of data to the buffer 220 and then performing the write operation(s) based on the group corresponding to the target tile.

Figure 5:
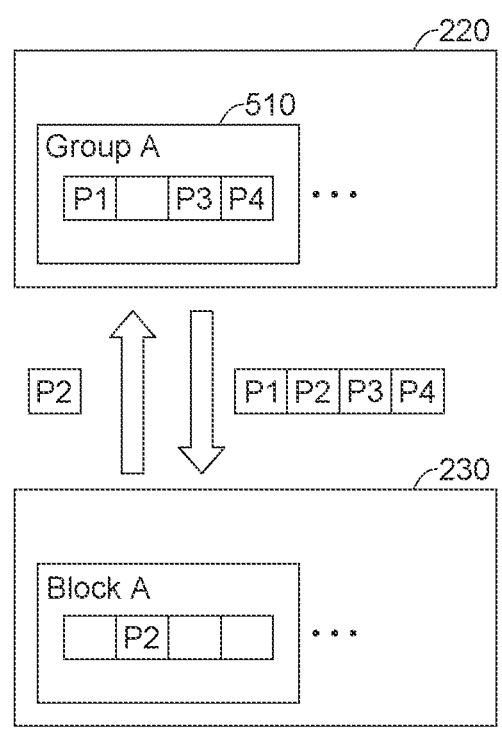
FIG. 5 illustrates the operation of the memory device according to an embodiment of the present disclosure.

For example, as shown in FIG. 5, it is assumed that one write operation allows a maximum data size of 256B, the group 510 corresponding to the target tile stores the data P1, P3 and P4 to be written into the first page, the third page and the fourth page of the target tile, and the size of the first page, the third page and the fourth page is 64B. If the second write policy is not applied, the memory controller 210 needs to perform one 64B write operation for data P1 and one 128B write operation for data P3 and P4. However, based on the second write policy, the memory controller 210 determines that the four pages to be written for data P1-P4 would be continuous if the data P2 stored in the second page is read to the group 510. That is, after the memory controller 210 performs one read operation to read the data P2 from the target tile of the memory array 230 to the group 510 of the buffer 220, the memory controller could write the data P1-P4 into the target tile by performing one 256B write operation. It is equivalent to spending a latency of one read operation to save a latency of one write operation. Since the memory device 20 has the characteristic that the read latency is much less than the write latency (e.g., read latency is one-thousandth of write latency), it is worth spending one or even more read operations to save one or more write operation.

In order to manage write disturbance, the memory controller 210 could configured to store a number of written interval tables in the memory array 230, and store a number of write counter values and a number of written or not tables in the buffer 220. In an embodiment, the write counter values, the written or not tables and the written interval tables could be established and modified by the memory controller 210.

The write counter values are respectively corresponding to the tiles. For each of the tiles, the corresponding write counter value represents the number of write operations that have been performed to the tile. When any page of the tile is written, the write counter value corresponding to the tile increase 1. For example, assuming the memory array 230 includes X tiles, the buffer 220 may store X write counter values corresponding to the X tiles. The write counter value has an initial value and an upper bond value. After the write counter value achieves the upper bond value, before next increasing of the write counter value, the write counter value would be reset to the initial value. In an embodiment, the initial value is 0. The upper bond value could be determined according to a tolerance number of write disturbance. "Write disturbance" refers to that when a page is written, the data stored in the adjacent pages might be affected. Data stored in a page might become corrupted as the number of write disturbances. Through experiments and statistics, the tolerance number against write disturbance of the pages could be obtained. That is, when the number of write disturbances greater than the tolerance number, data stored in the page might become corrupted. In an embodiment, the upper bond value equals to the tolerance value. For the convenience of explanation, the upper bond value and the tolerance value would be assumed as 100000 (100 k).

The write counter value is divided into a number of intervals from the initial value to the upper bond value. In an embodiment, it is divided into ten intervals S0-S9 from 0 to 100 k, as shown in FIG. 6. The first interval S0 is 0 to 10 k, the second interval S1 is 10001 to 20 k, and so on.

In an embodiment, the number of the written interval tables is the same as the number of the tiles of the memory array 230. The written interval tables are one-to-one corresponding to the tiles, and configured to record the interval in which the pages of the tiles are last written. For example, assuming that the memory array 230 includes X tiles and each of the tiles includes Y pages, the memory array 230 may store X written interval tables corresponding to the X tiles, and each of the written interval tables includes Y fields corresponding to the Y pages, wherein Y in an positive integer. These fields are used to record the interval in which the corresponding pages last written. FIG. 7 shows an example of the written interval table corresponding to one of the tiles, wherein the tile includes 4096 pages. In this example, the intervals S0-S9 could be represented by 4-bit binary data. For example, 0-9 in binary would be used to represent the intervals S0-S9. That is, 0000 represents the interval S0, 0001 represents the interval S1, 0010 represents the interval S2, and so on.

In an embodiment, the number of the written or not tables is the same as the number of the number of the tiles of the memory array 230. Written or not tables are one-to-one corresponding to the tiles, and configured to record whether the pages of the tiles is written in the interval corresponding to the counter values of the tiles. When the interval of the tile corresponding to the written or not table changes, the memory controller 210 would rest the written or not table after the memory controller 210 updates the written interval table corresponding to the same tile according to the written or not table. In an embodiment, assuming that the memory array includes X tiles and each of the tiles includes Y pages, the buffer 220 may store X written or not tables corresponding to the X tiles, and each of the written or not tables includes Y fields corresponding to the Y pages. Each of the fields could be filled by 1-bit binary data to record whether the corresponding page is written in the interval corresponding to the write counter value of the tile, wherein 0 could represent "not written", and 1 could represent "written". When the written or not table is reset, the values filled in all the fields would be reset to 0. FIGS. 8-10 show an example of the written or not table corresponding to one of the tiles. When the write counter value is 0, the fields corresponding to the pages in the written or not table are filled with 0, as shown in 8. When the write counter value come to 1, assuming that the page #1 is written, the field corresponding to the page index #1 would be set to 1, as shown in FIG. 9. When the write counter value come to 2, assuming that the page #3 is written, the field corresponding to the page index #3 would be set to 1, as shown in FIG. 10. When the write counter value come to 3, assuming that the page #1 is written, the field corresponding to the page index #1 would keep 1, and the written or not table is the same as that shown in FIG. 10. When the write counter value come to 10 k, before the write counter value become to 10001, the written or not table would be reset, the fields corresponding to all the pages would be reset to 0.

While the memory controller 210 update the corresponding written interval table according to the written or not table of a certain interval, the memory controller performs: (1) scanning the written or not table to find out which pages were written in the certain interval; and (2) modifying content of the fields corresponding to the pages which were written in the certain interval in the written interval table to the certain interval. For example, it is assumed that FIG. 11 shows the written or not table while the write counter value corresponding to a certain tile achieve 80 k (end of the interval S8), and FIG. 7 shows the corresponding written interval table that is not updated. After the memory controller 210 updates the written interval table shown in FIG. 11 according to the written or not table shown in FIG. 7, the written interval table shown in FIG. 12 would be obtained. From FIG. 11, the page #1 and the page #3 of the tile were written in the interval S8. Thus, in FIG. 12, the fields corresponding to the page index #1 and the page index #3 are updated to 1000 representing the interval S8. The fields corresponding to the pages which were not written in the interval S8 would not be modified.

In another embodiment, the number of the written or not tables is less than the number of the tiles of the memory array 230. Each of the written or not table dynamically corresponds to one of a number of tiles. For example, assuming that the memory array 230 includes X tiles and there are Z written or not tables, each of the written or not table may dynamically corresponds to one of (X/Z) tiles, wherein Z is a positive integer. For example, it is assumed that a certain written or not table dynamically corresponds to the tile #1 and the tile #2. When the memory controller 210 performs the write operation on the tile #1, the memory controller 210 would corresponds the written or not table to the tile #1 to use the written or not table to record whether the pages of the tile #1 are written in the interval. When the memory controller 210 changes to write the tile #2, the memory controller 210 would firstly update the written interval table corresponding to the tile #1 according to the current written or not table (the updating method is previously described), then reset the written or not table, and correspond the written or not table to the tile #2 to record whether the pages of the tile #2 are written in the interval. Such operation is equivalent to "replace" from the written or not table for the tile #1 to the written or not table for tile #2.

In an embodiment, until the next interval comes, the written or not table for the for the tile which is replaced would not be used to replace others, to avoid frequently changing the tile corresponding to the written or not table. For example, it is assumed that a certain written or not table dynamically correspond to the tile #1 and the tile #2. It is assumed that in the interval S2, the target to which the memory controller 210 performs the write operation changes from the tile #1 to the tile #2, and then changes back to the tile #1 from the tile #2. After the memory controller 210 replace the written or not table for the tile #1 with the written or not table for the tile #2, until the interval changes from S2 to S3, the memory controller 210 would not replace others with the written or not table for tile #1. In an embodiment, during the period that the written or not table for tile #1 is replaced, if the memory controller 210 performs write operation on the tile #1, the memory controller 210 could directly modify the written interval table in the memory array 230.

In an embodiment, one written or not table corresponds to two or more tiles. For example, FIG. 13 shows the written or not table corresponds to two tiles, wherein the first 2048 fields of the written or not table correspond to the pages #1-#2048 of the tile #0, and the last 2048 fields correspond to the pages #2049-#4096 of the tile #4. In this embodiment, the memory controller 210 need to add labels with a number of bits for the written or not table, to represent the tile to which the fields correspond. In FIG. 13, for the written or not table, the memory controller 210 add a 3-bit label 000 to represent that the fields corresponding to the page index #1-#2048 are for tile #0, and add a 3-bit label 0100 to represent that the fields corresponding to the page index #2049-#4096 are for tile #4.

The following paragraph would describe how the memory controller 210 applies the written interval tables, the written or not tables and the write counter values to avoid stored data being corrupted by write disturbances.

For each of the tiles, the memory controller 210 could set a check period. When the write counter value of a certain tile achieves the check period, the memory controller 210 performs a check operation on the certain tile. Performing the check operation on the certain tile refers to check the written interval table corresponding to the certain tile to check if there are any page in the certain tile need data flush. Performing data flush for a certain page refers to that the memory controller 210 rewrites the data corresponding to the certain page stored in the buffer 220 into the certain page, to keep the accuracy of the data stored in the certain page, wherein the data corresponding to the certain page could have been in the buffer 220 before data flush is triggered, or read from the certain page to the buffer 220 after data flush is triggered.

In an embodiment, the check period is fixed. For example, the memory controller 210 could set the check period fixed to the beginning of the end of the intervals S2, S5, S8.

In an embodiment, the check period could be adjusted dynamically. For each of the tiles, whenever the check period is performed on the tile, the memory controller 210 could set the new check period as a subsequent interval closest to the current interval recorded in the fields of the written interval table corresponding to the tile. The sequent interval refers to the interval after the current interval. For example, the subsequent intervals of the interval S0 are S1, S2, S3, S4, S5, S6, S7, S8 and S9 in order from high to low according to the proximity. For example, the subsequent intervals of the interval S5 are S6, S7, S8, S9, S0, S1, S2, S3 and S4 in order from high to low according to the proximity. For example, it is assumed that the initial check period is set as the beginning of the next interval S0. For a certain tile, the first check operation would be triggered after the corresponding write counter value achieves 100 k. When the check operation is triggered, the memory controller 210 could load the written interval table into the buffer 220 after the corresponding written interval table is updated with the corresponding written or not table (for interval S9). It is assumed that the corresponding written interval table is shown in FIG. 14. At the end of the interval S9 and the beginning of the interval S0, 100 k times of write operation have been performed on the certain tile, which means that, in the worst case, the page whose last written interval is S0 may suffer 100 k times of write disturbances. In the check operation, the memory controller 210 may find out the field(s) which record(s) the same interval as the current one (in this example, S0). In FIG. 14, the fields corresponding to the page index #1 and #4096 record 0000 representing S0. Thus, the memory controller 210 determines that the page #1 and #4096 need data flush. Next, the memory controller 210 would determine the next check period. The memory controller 210 finds the subsequent interval closest to the current interval from the written interval table. In FIG. 14, it is assumed that no field records 0001 representing the interval S1. Thus, the closest subsequent interval is 0010 representing the interval S2 recorded in the field corresponding to the page index #2. The memory controller 210 may set the next check period as the interval S2.

Figure 3A:
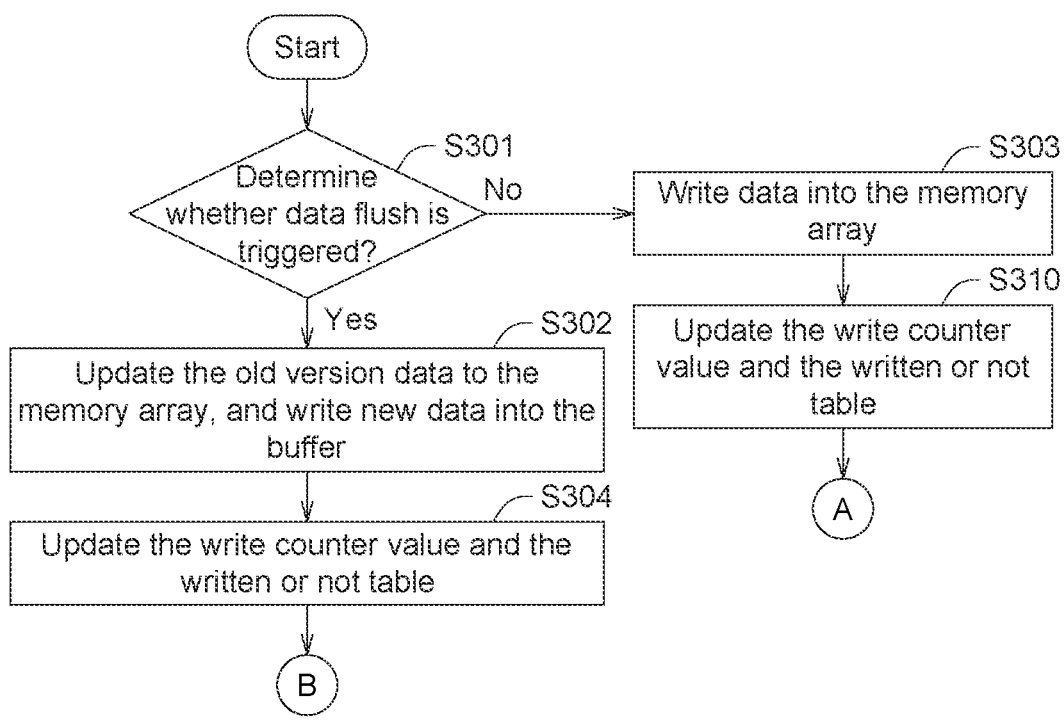
FIGS. 3A-3B shows a flowchart of operation method of memory device according to an embodiment of the present disclosure.
Figure 3B:
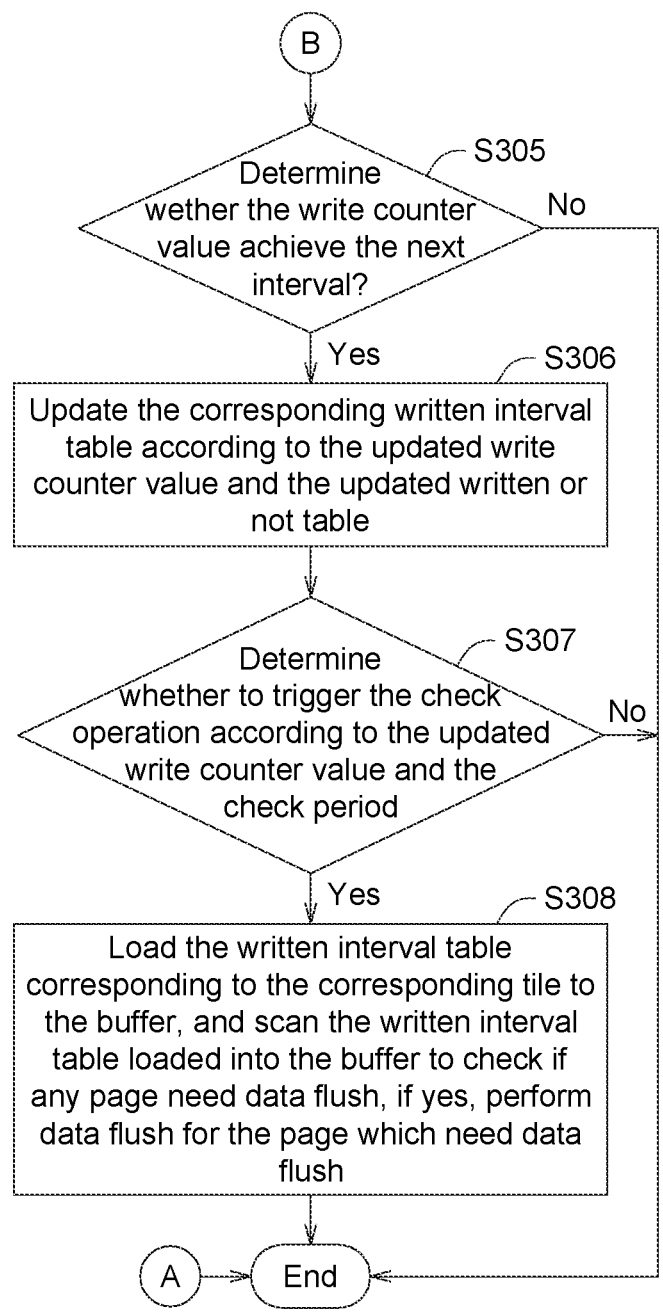

Referring to FIGS. 3A-3B, FIGS. 3A-3B shows a flowchart of operation method of memory device according to an embodiment of the present disclosure. The method shown in FIGS. 3A-3B could be performed by the memory controller 210 in response to each write request from the central processing unit 110. At step S301, determine whether to trigger data flush. If yes, perform step S302; if no, perform step S303. in an embodiment, when the data to be written is new data (e.g., from the central processing unit 110) and the storage space of the buffer 220 is full, the memory controller 210 could determine to trigger data flush. In an embodiment, when the data to be written is old data which is already in the buffer 220 or the storage space of the buffer 220 is not full, the memory controller 210 could determine not to trigger data flush.

At step S302, update the old data in the buffer 220 to the memory array 230, and write the new data into the buffer 2220. For example, if the new data is going to be written into a target tile, the memory controller 210 performs data flush on the target tile according to the old data corresponding to the target tile in the buffer 220, and then overwrites the old data corresponding to the target tile in the buffer 220 with the new data.

At step S303, write the data into the memory array 230. For example, write the new data from the central processing unit 110 into the buffer 220, and then write the new data in the buffer 220 into the memory array 230. Otherwise, update the memory array 230 according to the old data in the buffer 220.

At step S304, update the write counter value and the written or not table. For example, after perform data flush on the target tile, update the write counter value and the written or not table corresponding to the target tile.

At step S305, determine whether the write counter value achieves the next interval (e.g., determine whether the write counter value updated in S304 achieves the next interval). If yes, perform S306; if no, end the process.

At step S306, update the corresponding written interval table according to the write counter value and the written or not table updated in S304.

At step S307, determine whether to trigger the check operation according to the updated write counter value and the check period. If yes, perform S308; if no, end the process.

At step S308, load the written interval table corresponding to the tile (e.g., the target tile) into the buffer 220, scan written interval table loaded in the buffer 220 to check whether any page need data flush, if true, perform data flush on the page(s) which need data flush, and reset the write counter value.

At step S310, update the write counter value and the written or not table.

Figure 4A:
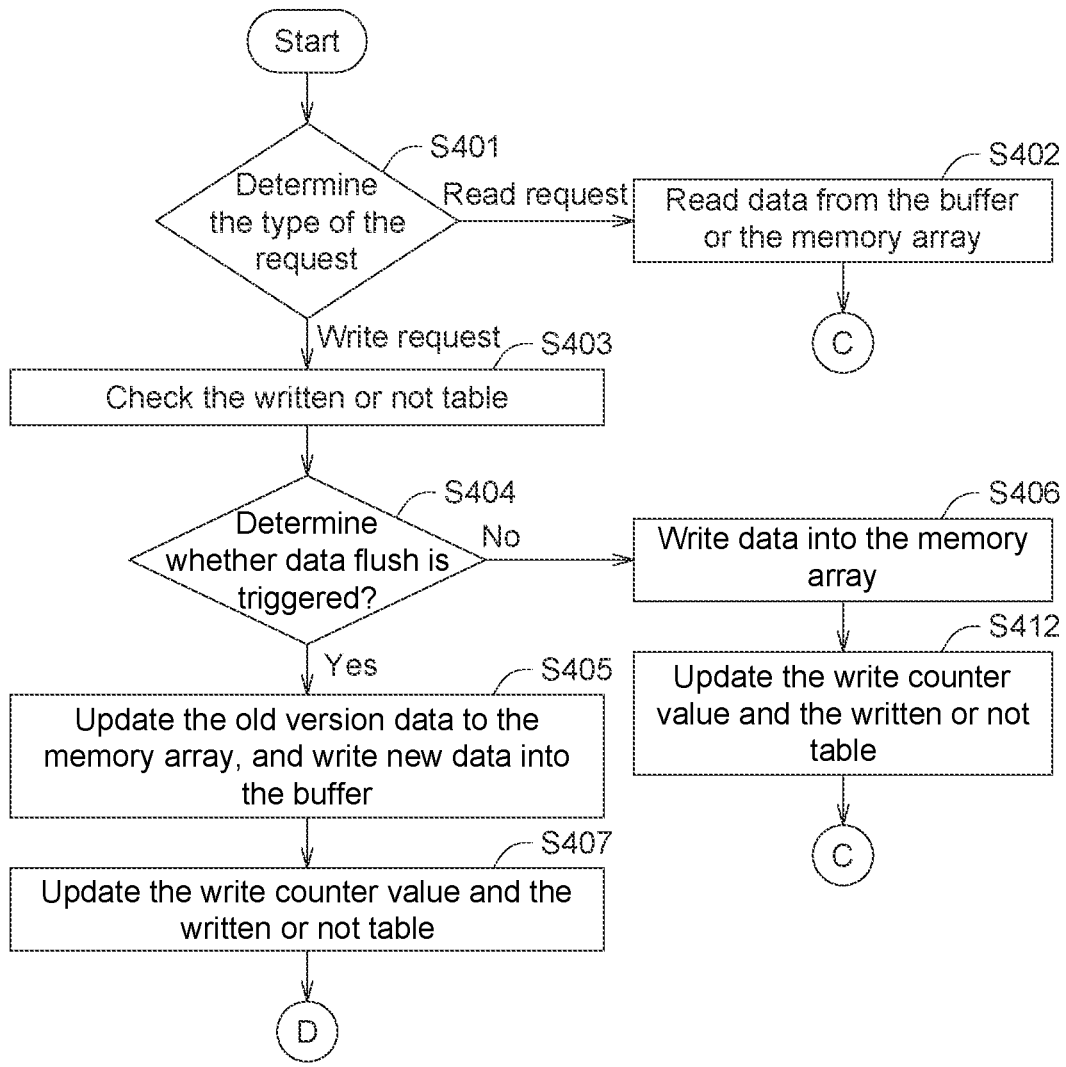
FIGS. 4A-4B shows a flowchart of operation method of memory device according to another embodiment of the present disclosure.
Figure 4B:
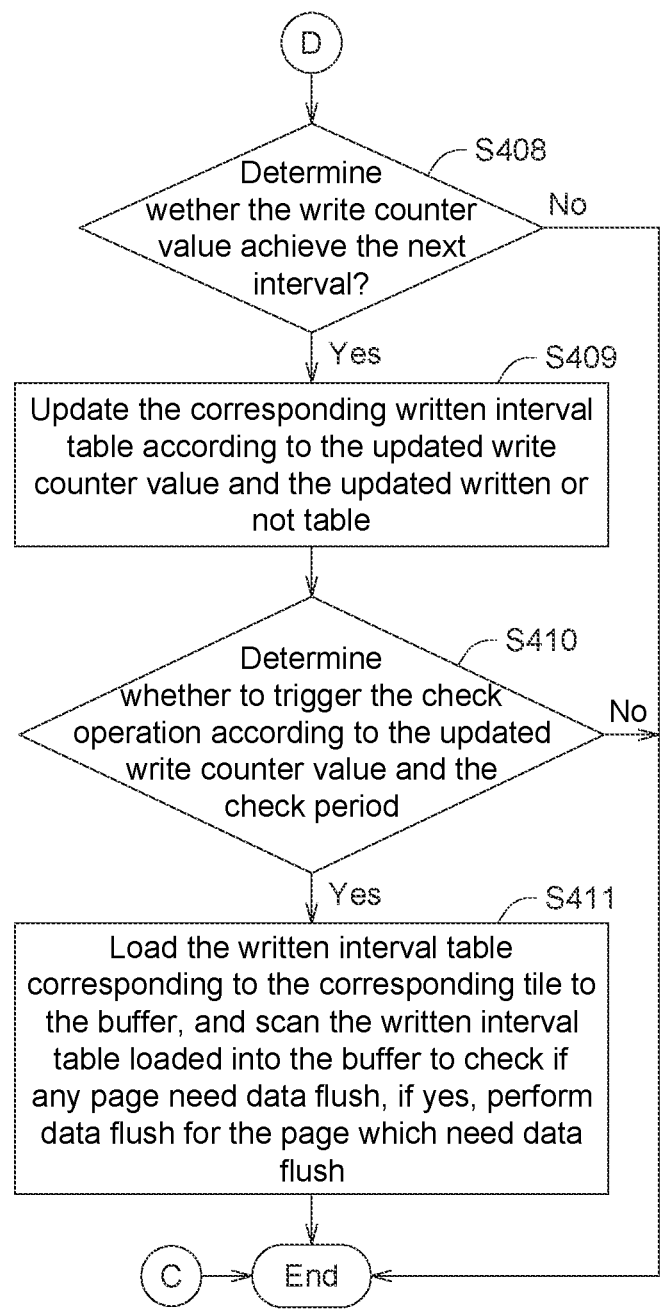

Referring to FIGS. 4A-4B, FIGS. 4A-4B shows a flowchart of operation method of memory device according to another embodiment of the present disclosure. The method shown in FIGS. 4A-4B could be performed by the memory controller 210 in response to each write from the central processing unit 110, wherein the request could be write request or read request.

At step S401, determine the type of the request. If the request is read request, perform S402; if the request is write request, perform S403.

At step S402, read data from the buffer 220 or the memory array 230.

At step S403, check the written or not table, to facilitate the performing of S404.

Steps S404-S413 are similar to steps S301-S310. The detail of steps S404-S413 could refer to the above description, and would not be described herein repeatedly.

With the present disclosure, the number of the write operations actually performed could be decreased, and the write disturbances could be finely managed to avoid data corrupted by write disturbances.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, comprising:
a memory controller;
a buffer, coupled to the memory controller or embedded in the memory controller, a storage space of the buffer configured by the memory controller to include a plurality of groups; and
a memory array, coupled to the memory controller, and comprising a plurality of tiles,
wherein the groups are one-to-one corresponding to the tiles, each of the groups is configured to store data to be written into the corresponding tile, and the memory controller performs one or more write operations based on the groups and makes a plurality of physical addresses of a plurality of pages of the each of the tiles corresponding to a same hash value by a hash function; and wherein the memory controller determines whether the data to be written into the corresponding tile is new data and the storage space of the buffer is full, when the data to be written into the corresponding tile is determined as new data and the storage space of the buffer is determined as full, the memory controller determines to trigger a data flush.

2. The memory device according to claim 1, wherein before the memory controller performs the one or more write operations on one of the memory tiles, determine whether a number of the one or more write operations actually performed will be decreased by reading a portion of data stored in the one of the memory tiles to the buffer, while the determination is true, read the portion of data stored in the one of the memory tiles to the buffer, and then performs one or more write operations based on the group corresponding to the one of the memory tiles.

3. The memory device according to claim 1, wherein the buffer comprises a plurality of write counter values and a plurality of written or not tables, the write counter values are one-to-one corresponding to the tiles, each of the write counter values is used to record a number of the one or more write operations performed on the corresponding tile, the write counter values have an initial value and a upper bond value, each of the counter values are divided into a plurality of intervals from the initial value to the upper bond value, the written or not tables are configured to record whether a plurality of pages of the tiles are written in the intervals corresponding to the write counter values.

4. The memory device according to claim 3, wherein the memory controller comprises a plurality of written interval tables, the written interval tables are one-to-one corresponding to the tiles, each of the written interval tables is used to record a plurality of intervals in which a plurality of pages of the corresponding tile were last written.

5. The memory device according to claim 4, wherein while the intervals corresponding to the write counter value corresponding to each of the tile changes, the memory controller updates a corresponding written interval table with a corresponding written or not table.

6. The memory device according to claim 4, wherein the memory controller set a check period corresponding to each of the tiles, when the write counter value of corresponding to each of the tiles achieves the check period, the memory controller determines whether to trigger the data flush according to the corresponding written interval table and the check period corresponding to each of the tiles.

7. An operation method of memory device, comprising:
configuring a storage space of a buffer to include a plurality of groups;
making the groups one-to-one corresponding to a plurality of memory tiles of a memory array;
determining whether data to be written into a corresponding tile is new data and the storage space of the buffer is full;
determining whether a number of one or more write operations actually performed will be decreased by reading a portion of data stored in one of the memory tiles to the buffer, while determining the number of one or more write operations will be decreased, reading the portion of data stored in the one of the memory tiles to the buffer; and
performing one or more write operations based on the group corresponding to the one of the memory tiles,
wherein each of the groups is configured to store data to be written into the corresponding tile, when the data to be written into the corresponding tile is determined as new data and the storage space of the buffer is determined as full, triggering a data flush.

8. An operation method of memory device, comprising:
establishing a plurality of write counter values and a plurality of written or not tables in a buffer; and
establishing a plurality of written interval tables in a memory array,
wherein the write counter values are one-to-one corresponding to a plurality of memory tiles, each of the write counter values is used to record a number of one or more write operations performed on the corresponding tile, each of the write counter values have an initial value and a upper bond value, each of the counter values is divided into a plurality of intervals from the initial value to the upper bond value, the written or not tables are configured to record whether a plurality of pages of each of the memory tiles are written in the intervals corresponding to the write counter values, the written interval tables are one-to-one corresponding to the memory tiles, each of the written interval tables is used to record the intervals in which the pages of the corresponding one of the memory tiles were last written.

9. The operation method according to claim 8, further comprising:
for each of the written interval tables, while one of the intervals of a corresponding one of the write counter values corresponding to each of the tiles changes, a memory controller updates the corresponding written interval table with a corresponding one of the written or not tables.

10. The operation method according to claim 8, further comprising:
for each of the tiles, set a check period;
for each of the tiles, determining whether the corresponding write counter value achieves the check period; and
for each of the tiles, determining whether to trigger a data flush according to the corresponding written interval table and the check period.

* * * * *